Aug. 14, 1934.     S. BERGMANN ET AL     1,970,217
TELEPHONE SYSTEM
Filed Oct. 29, 1930

Patented Aug. 14, 1934

1,970,217

UNITED STATES PATENT OFFICE 1,970,217

TELEPHONE SYSTEM

Stephan Bergmann and Josef Charwat, Vienna, Austria, assignors to Naamlooze Vennootschap "Elin" Nederlandsche Maatschappij voor electrische Industrie, Amsterdam, Netherlands Application October 29, 1930, Serial No. 491,984
In Austria July 16, 1930

3 Claims. (Cl. 179—6.3)

This invention relates to a device for the transmission of intelligence such as messages and for the distribution of news adapted to operate in conjunction with an existing telephone system, and irrespective of the type of exchange employed in that system. The invention consists essentially in the provision of accessory devices to the telephones by means of which calls to a message and news agency situated anywhere within the system can be effected, checked, registered and paid for. These devices take the form, in the case of public automatic telephones, of preferably acoustic signalling devices for the insertion of additional coins, and, in the case of private telephones, of similar signalling devices and of registering devices for the number of calls made. The said agency is enabled by the invention to check the speaker's or subscriber's right to its services, i. e. the payment of the fee or the actuation of the registering device, before proceeding to enter the message for transmission or to impart the information required.

The device in accordance with the invention, employing the accessory devices to be described hereafter, creates an agency for the transmission and distribution of private and public messages and information through the intermediary of existing telephone systems in the simplest possible manner. The device is entirely self-contained, embodies its own checking system, is equally applicable to public and private telephones, can be adapted to serve for the transmission of every kind of information, and is completely independent of the exchanges in the telephone system concerned.

In addition to the existing exchanges, that is to say independently of these exchanges, there are provided special calling exchanges with one or more lines according to the size of the telephone system, in which latter exchanges the matter to be communicated is systematically registered either automatically or by hand and held in readiness for delivery on demand.

For the purpose of simplifying the checking of the payment of the transmission fee, and at the same time to render the use of the device available to all classes of the population, the invention provides for the possibility of the employment of the transmission agency from automatic public telephones. For this purpose the latter are fitted with special signalling devices by means of which the operator at the agency can check the payment in advance of the transmission fee, the signalling device used being not limited to any particular type. For instance there can be provided in connection with the coin-shaft of the automatic telephone a rocker which strikes a bell which is inaccessible from outside, and which is rendered audible to the operator after the establishment of the connection. Any other type of signalling device may be employed in place of the acoustic type just mentioned. All that is essential is the provision of such signalling devices in connection with automatic public telephones for the purpose, on the one hand, of rendering the use of the message agency or intelligence bureau available to the general public, and, on the other hand, of enabling the payment for the services of the agency to be made in connection with an already existing coin paying device, and also of simplifying the checking of the payment.

For the purpose of enabling any private telephone to be included in the system of message transmission there are allocated to these telephones special signalling devices which are combined either with a coin-receiver or with a non-reversible checking register actuated by a system of rods. By the addition of an accessory device of this type any private telephone can be equipped as a sending and receiving station in connection with the central agency, the number of calls made within a given space of time being checked either by the contents of the coin receiver or by the reading of the register, according to the type of accessory device used.

Several forms of such accessory devices are shown, by way of example, in the accompanying drawing, in which:—

Figure 1:
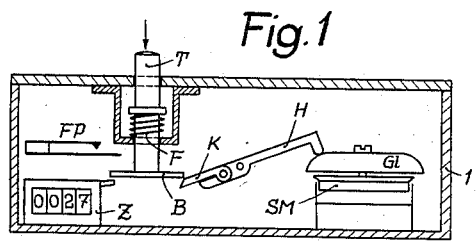
Fig. 1 is a section of a signalling device assembled in a case, the releasing mechanism being illustrated diagrammatically.

Referring to Fig. 1 the signalling device consists of a casing 1 in which the sound instrument (in this case bell G1) is located, this instrument being adapted to be struck and caused to sound by means of a hammer H. In the immediate vicinity of the sounder there is arranged a signalling microphone SM which is electrically connected, in a manner to be described in the further course of this specification, to the telephone concerned.

Figure 5:
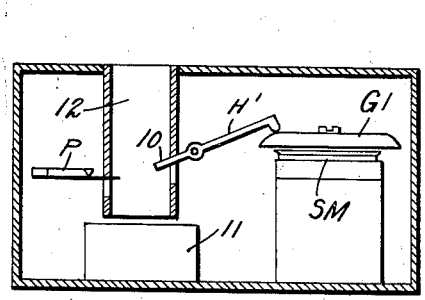
Fig. 5 is a vertical section of a signalling device similar to that of Fig. 1, but with coin control instead of push button control.

The hammer is actuated in the simplest form of construction, shown in Fig. 5, by a coin lever 10 which is located in coin chute 12 and is tilted by the insertion of the fee for a connection with the message agency. The coin lever may actuate an independent hammer, or it may be a part of the hammer, as shown at H' in Fig. 5. In this case a coin collecting compartment 11 is included within the casing 1, the contents of this compartment constituting in the simplest manner the check on the number of calls made on the agency.

Since however in the case of private telephones the separate payment of each fee is troublesome and impractical the releasing mechanism of the signalling device can be actuated by the pressing of a button, the turning of a key, or the like, suitable checking devices for registering the number of calls made being provided in the casing 1, so that the total of the fees due can be paid at certain intervals of time.

In the form of construction shown in Fig. 1 there is provided for this purpose in the casing 1 a button T, which is retained normally in the upper extreme position by means of the spring F, in which position a collar B connected with the button closes the electric contact FP. Beneath the disc-shaped collar B and in the path of the same when depressed there project both the free end of the hammer H, which takes the form of a fulcrumed lever and is provided with a pawl K, and also the actuating lever of a counting register Z, which may be of any suitable type.

Figure 2:
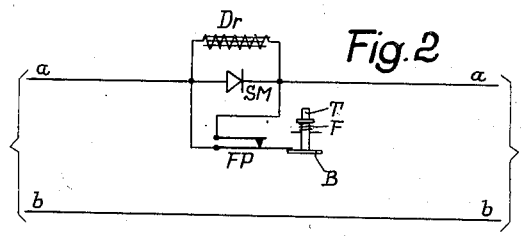
Fig. 2 is a diagram of connections for Fig. 1.
Figure 6:
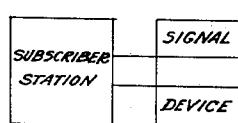
Fig. 6 is a diagrammatic view of a telephone system in accordance with this invention.

Fig. 6 shows the general arrangement of the system in which the subscriber's station or public station is connected to the message agency through the central exchange, the signal device being inserted in the subscriber's loop. When the subscriber calls up the message agency for the purpose of either of depositing or of receiving a message for which there is a charge he must give the agency a signal to show that he is entitled to service on the part of the agency. For this purpose, after the establishment of the connection, he presses the button T momentarily down. The collar B on the button T thereby depresses the pawl K and lifts the hammer H. At the end of the downward movement the collar B slips past the end of the pawl K and the hammer is allowed to drop on to the sound instrument (bell) G1. The bell G1 is rigidly connected to a signalling microphone SM, so that the sound of the bell can be directly transmitted into the existing connection. The electric connections for the signalling microphone SM are shown in Fig. 2 from which it will be seen that the signalling microphone is interposed in the loop line $a$ and is normally short-circuited by means of a controllable short-circuit in the spring circuit breaker FP, the lower contact of which, in Fig. 1, tends to spring away from the upper contact. The circuit breaker is normally held closed by the action of collar B pressed upward by spring F. The circuit breaker is opened by depression of the button T, which releases the lower contact and allows it to spring away from the upper contact. The signalling microphone is thus in circuit. Since in this same position of the button T the giving of the signal is also effected the sound of the bell will be directly transmitted at the moment of depression of the button T through the signalling microphone SM to the agency. When the button T is released the spring F presses the collar B against the spring unit FP, which is again short-circuited and thus renders the signalling microphone in the $a$-line dead. In the arrangement shown in Fig. 5 the circuit breaker P is constructed so that the contacts are normally together and are opened by a coin dropping through chute 12 about the time hammer H' strikes the bell G1. The circuit used with Fig. 5 is the same as that shown in Fig. 2. For reasons of safety a choke coil $Dr$ is connected in parallel to the microphone SM to prevent an interruption of the connection if the microphone carbon should lie badly.

For the checking of the number of calls on the agency every depression of the button causes the counting register Z to be moved forward one digit. This register is so constructed that it cannot be brought back to the zero position by continued depression of the button, but can only be readjusted from the highest number to the zero position by an authorized representative of the agency.

The described device has the disadvantage that at every depression of the button, even when unintentional through the laying of a heavy object on the casing or through careless manipulation of the button, the register is moved forward, and more calls can thus become registered than have actually been made.

Figure 3:
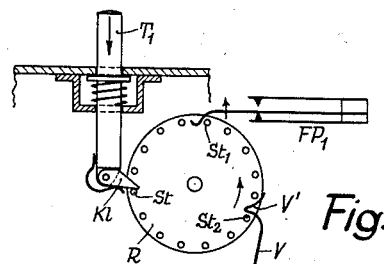
Fig. 3 is a view, in part section, of another form of construction.
Figure 4:
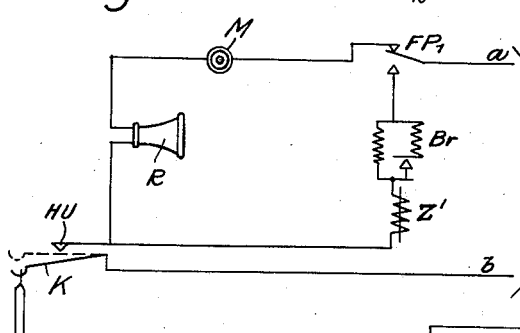
Fig. 4 is a diagram of connections for Fig. 3.

This drawback is obviated in the form of construction shown in Figs. 3 and 4 in which both the giving of the signal and the moving forward of the register is effected electrically through a mechanical releasing device.

For this purpose a bridge is inserted in the loop $a$—$b$ connected in parallel to the telephone apparatus. This bridge comprises a sound emitter $Br$ (e. g. an electric buzzer) and an electric register $Z'$, and is adapted to be connected into the loop as required by means of a two-point switch $FP_1$.

In the simplest form the switch $FP_1$ is operated by hand, e. g. by means of a button which switches over the spring $FP_1$ during the conversation with the agency and momentarily switches over the loop $a$—$b$ without interruption away from the telephone and into the bridge containing the buzzer and register. The register is thus moved forward and the acoustic signal, which may have a characteristic tone, given. This arrangement has the advantage that the register cannot be moved forward when the receiver is hung up, since the bridge circuit, as well as the circuit containing the microphone transmitter M and receiver R, is interrupted by the usual switch or circuit breaker HU controlled by the receiver hook K.

In order to obtain signals of constant length for the purpose of simplifying checking, and of preventing abuse, the invention provides further for the releasing of the switching over movement of the spring switch $FP_1$ by the depression of the button, without this switch being further influenced by the length of time during which the button is depressed.

This can be achieved for example in the manner shown in Fig. 3. The button $T_1$, which is pressed upwards into the position of rest by a spring, is provided at its lower end with a pawl $K_1$. When depressed this pawl presses against peg $St$ on the control-disc R and rotates the latter in an anti-clockwise direction. The powerful thrust spring V at first offers considerable resistance to this movement, until the peg $St_2$ which is momentarily in contact with the spring has pressed the latter so far out that the flat portion $V'$ of the thrust spring V is brought into action and presses the peg, which has meanwhile moved forward somewhat, further forwards with a sudden snap-movement. During this snap-movement another peg $St_1$ on the control disc momentarily actuates the switch $FP_1$. This latter step is independent of the position of the button $T_1$. When this button is released and returns upwards the pawl K snaps into position behind the next peg, and puts the mechanism into the position of readiness for the giving of the next signal.

The described forms of construction do not limit the range of the invention. For example any other form of sound emitter (tuning-fork, gong, or the like) may be employed in place of the bell or buzzer, or the signal may be effected by means of an alteration of potential in the line, or by any other known means.

In place of the button T a key (press-in key) can be employed for the release of the signalling mechanism, for the purpose of preventing the use of the devise by unauthorized persons.

In every case, immaterial whether the call originates from a public telephone or from a private telephone equipped with the described accessory device, after the giving of the signal as proof of the right of use, the message to be imparted is registered at the agency either automatically by means of a phongraph, inductive, or other means, or by hand by the employees of the agency, and kept in readiness for delivery on demand.

In answer to a call from any telephone (public or private) the message will be delivered telephonically and then struck from the register.

The device is suitable both for the transmission of private messages and for the distribution of general information, such as weather reports, news items, theatre and cinema programs, and the like. In these latter cases the imparting of the information required can be made dependent on the payment of a fee.

I claim:—

1. In a system for electrical transmission of intelligence, a telephone station comprising a receiver hook switch, an intelligence bureau, a central telephone exchange, communication channels between said telephone station and said bureau for completing connections between said station and said bureau, a normally inoperative signal device at said station, an electrical register in series with said device, and switch means for rendering operative said signal device and actuating said electrical register, said last-mentioned means comprising said receiver hook switch and an independent control switch.

2. The combination with a telephone system comprising two stations and electrical connections between said stations, of a signalling device, means for switching said device into the connections between said stations, said means comprising a rotatable disc, pegs on said disc, manipulative means carrying a pawl for engaging said pegs to turn said disc, a spring detent engaging said pegs, and a switch having a spring switch arm engaged by said pegs.

3. The combination with a telephone system comprising two stations, a central exchange, and loops connecting said stations with said central exchange, each station including a microphone circuit for transmitting spoken messages and a receiver hook switch adapted to disconnect said microphone circuit, of a signal circuit at one of said stations including signalling means, and means for alternatively switching said signal circuit or said microphone circuit into the loop of the station at which said signalling means is located, said signal circuit including contacts under the control of said receiver hook switch.

STEPHAN BERGMANN.
JOSEF CHARWAT.